United States Patent [19]

McCabe

[11] Patent Number: 5,012,791
[45] Date of Patent: May 7, 1991

[54] CHAFING DISH BURNER

[76] Inventor: George McCabe, 314 Westfield, Nashville, Tenn. 37221

[21] Appl. No.: 523,319

[22] Filed: May 14, 1990

[51] Int. Cl.$^5$ .................................................. F24C 5/00
[52] U.S. Cl. ........................................ 126/43; 126/44; 126/214 D
[58] Field of Search ............. 126/25 R, 25 A, 25 AA, 126/25 C, 25 B, 43, 40, 51, 52, 214 C, 220, 48, 46; 431/144, 146, 344

[56] References Cited

U.S. PATENT DOCUMENTS 3,606,609  9/1971  Lipper et al. ......................... 126/43
4,188,938  2/1980  Hasenfratz ............................ 126/43

FOREIGN PATENT DOCUMENTS 392646  12/1908  France .................................. 126/43
29461   2/1907   Switzerland ........................ 126/43
101569  10/1916  United Kingdom ................. 126/43

Primary Examiner—James C. Yeung
Attorney, Agent, or Firm—Stephen T. Belsheim

[57] ABSTRACT

A chafing dish burner including an open-topped cylindrical base, a cover having an opening therein selectively occludable by a linearly sliding valve, and an annular windscreen mounted to the cover in spaced relationship thereto by a plurality of legs.

17 Claims, 1 Drawing Sheet

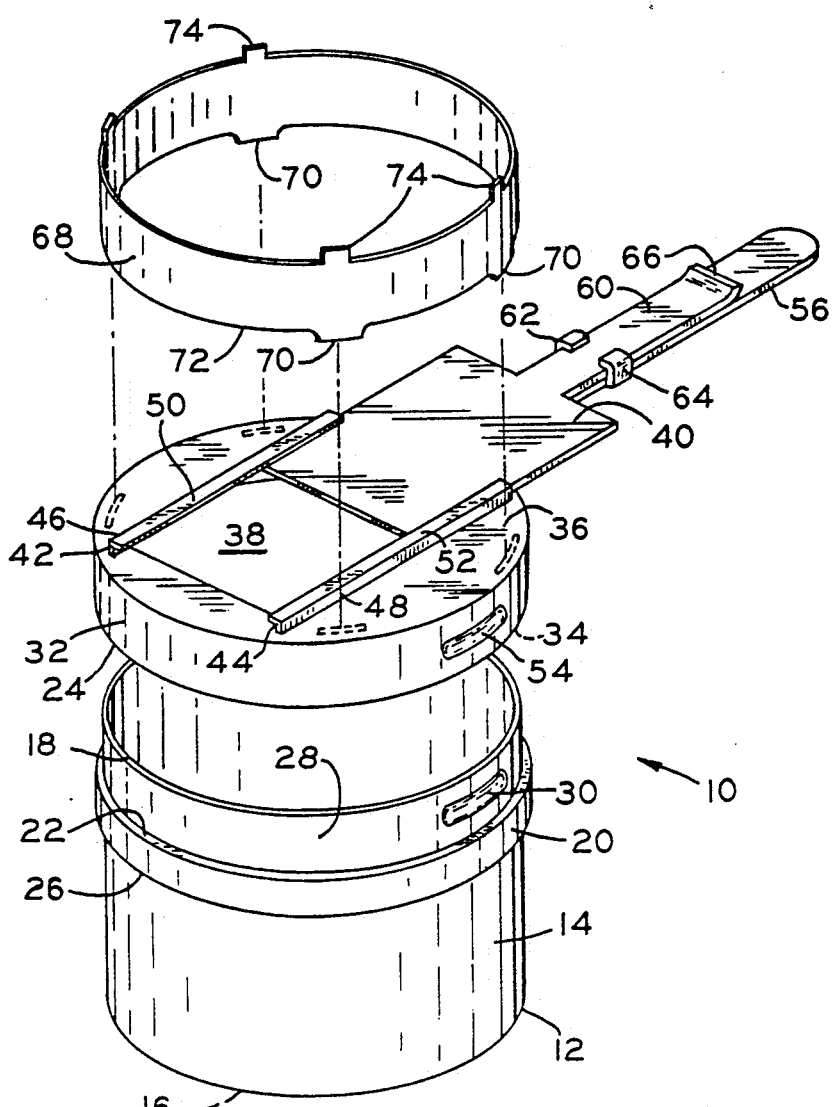
FIG_1
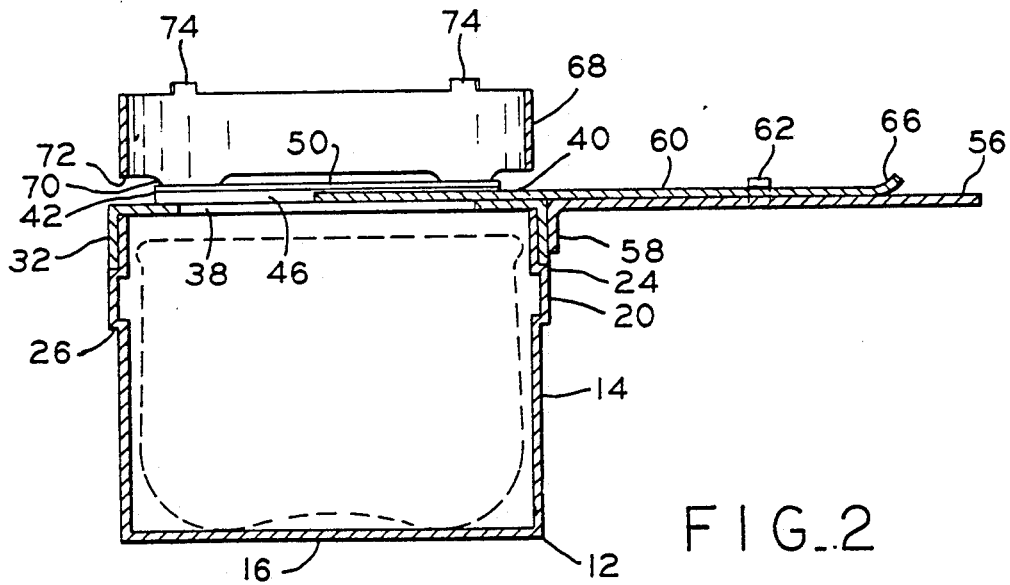
FIG_2

CHAFING DISH BURNER

BACKGROUND OF THE INVENTION

The present invention relates generally to heat sources for warming food, and more particularly to a burner for liquid or jellied fuel for use with a chafing dish or other food warming utensil.

Chafing dishes, fondue pots, and other such utensils are typically located on a serving table away from the point at which the food they contain was originally heated. In order to further heat the food or merely to keep the food warm, a source of heat such as a portable burner is provided under the chafing dish. Preferably, the intensity of the heat source is adjustable.

One known heat source is an alcohol burner which burns either liquid alcohol that is held in an absorbent material, or jellied alcohol that is often supplied in its own aluminum container with removable lid. Such alcohol burners sometimes include a valve closure for variably covering the exposed fuel for the purpose of regulating the flame or for extinguishing the flame.

One problem associated with using an open flame burner as a heat source is that the flame is susceptible to being blown out by incidental wind gusts which frequently occur when the chafing dish is used out of doors, and which also occasionally occur indoors due to locally occurring drafts. It would be desireable to provide a chafing dish burner which alleviates the problem of the flame being extinguished by ambient air currents or gusts of wind.

Another problem with known burners is that the valve closure is often mounted so as to pivot to the side, and there is not always sufficient clearance from other chafing dish supporting structure to permit the valve closure to travel through its full design range of motion. It would be thus be desirable to provide an improved valve mechanism.

SUMMARY OF THE INVENTION

A chafing dish burner constructed in accordance with the present invention involves, according to one aspect thereof, an open-topped base and a cover configured to close the open-topped base. The cover includes an opening therethrough and valve means including a sliding valve member for variably closing the opening. The sliding valve member is supported with respect to the cover so as to slide substantially linearly.

In accordance with another aspect of the present invention, a chafing dish burner includes an open-topped base and a cover configured to close the open-topped base. The cover includes an opening therethrough and an annular upstanding windscreen extending axially upwardly, the windscreen being axially spaced from the top by a plurality of downwardly extending legs such that an annular space interrupted by the legs is defined between the windscreen and the top.

It is an object of the present invention to provide an improved burner for a chafing dish or the like having an easy-to-operate flame valve.

It is a further object of the present invention to provide an improved burner for a chafing dish or the like which alleviates the problem of the flame being blown out.

Additional objects and advantages of the present invention will be apparent from the following descriptions and the drawings referenced thereby.

BRIEF DESCRIPTION OF THE DRAWINGS

FIG. 1 is a partially exploded perspective view of a chafing dish burner in accordance with the present invention wherein the windscreen is shown disattached from the burner cover for clarity; and FIG. 2 is a sectional view of the chafing dish burner of FIG. 1, taken along a plane including the vertical axis of the burner and the handle.

DESCRIPTION OF THE PREFERRED EMBODIMENT

Referring to the figures, there is illustrated a chafing dish burner 10 in accordance with the present invention. Burner 10 includes a base 12 constructed as a hollow cylinder having a sidewall 14, a bottom wall 16 closing the bottom of the cylinder, and an open top defined by an upper perimetrical rim 18. The cylinder is metallic and may be made from aluminum, stainless steel or the like. Disposed circumferentially about base 12 is an annular protrusion 20 which extends radially outwardly from sidewall 14. Protrusion 20 has an upper annular surface 22 extending in a horizontal plane that serves as a stop for supporting cover 24 of burner 10, described further below. A lower annular surface 26 of protrusion 20 extends in a horizontal plane and serves as a stop to support base 12 of burner 10 within an annular support ring connected with the base of a chafing dish (not illustrated). Protrusion 20 is disposed intermediate rim 18 and bottom wall 16, and together with rim 18 defines therebetween a lip portion 28 that is shaped as a substantially round hollow cylinder except for a pair of diametrically opposed elongate lock channels 30 formed in the outer surface of lip portion 28 and extending in the circumferential direction. Each of lock channels 30 also extends radially inwardly so a to form a concave depression in the outer surface of lip portion 28.

Cover 24 includes a substantially round hollow cylindrical sidewall 32 having an inner diameter slightly larger than the outer diameter of lip portion 28 of base 12 so as to fit thereover in axially sliding fashion. Sidewall 32 has an axial height slightly greater than that of lip portion 28 of base 12, and has a lower annular surface 34 extending in a substantially horizontal plane. Lower annular surface 34 engages upper annular surface 22 of annular protrusion 20 when cover 24 is placed on base 12 with sidewall 32 of cover 24 surrounding lip portion 28 of base 12. Cover 24 is open at the bottom end and is closed at the top end by top 36 which includes a closable rectangular opening 38 therein. Opening 38 is closable by slide valve 40 which is slidable in horizontal channels defined by L-brackets 42 and 44 which are located on opposite sides of opening 38. Each L-bracket 42 and 44 includes a respective upstanding leg 46/48 extending upwardly from top 36, and connecting with a respective horizontal leg 50/52 extending from the upstanding leg inwardly toward opening 38 so as to overlie the side edges of slide valve 40. Slide valve 40 is sized so as to completely overlie and close opening 38 when in its closed orientation, and to slide horizontally between L-brackets 42 and 44 to permit variable exposure of opening 38. A pair of diametrically opposed lock projections 54 extend in the circumferential direction about cover sidewall 32 and also extend substantially radially outwardly therefrom. Lock projections 54 are shaped to be received in mating fashion by corresponding lock channels 30 in lip portion 28 of base 12, to releasably secure cover 24 to base To facilitate manipulation of burner 10, especially when hot, cover 24 is provided with a handle 56 extending radially outwardly therefrom. Handle 56 includes a downturned portion 58 at the inboard end thereof that is fixed to sidewall 32 of cover 24. When cover 24 is attached to base 12, the whole assembly can be picked up or turned by means of handle 56. Extending along handle 56 in sliding engagement therewith is slide valve lever 60 which is attached to one end of slide valve 40 and extends therefrom in the same plane. Lever 60 is retained in sliding engagement with handle 56 by a pair of tabs 62 and 64 which are integral with handle 56 and extend laterally outwardly therefrom in opposite directions, and thence upwardly and inwardly so as to overlie lever 60. Tabs 62 and 64 retain lever 60 against upward or lateral movement, while handle 56 itself retains lever 60 against downward movement. Lever 60 remains free to move in the longitudinal direction of handle 56 which is parallel to L-brackets 42 and 44, thereby permitting sliding of slide valve 40. An upturned tab 66 at the outboard end of lever 60 facilitates easy manipulation of lever 60 by means of one's thumb, for example.

Attached to top 36 of cover 24 is an annular upstanding windscreen 68 of substantially similar diameter to that of cover 24. Windscreen 68 is attached to top 36 by a plurality of downwardly extending legs 70 which support windscreen 68 in axially spaced relationship to cover 24. An annular space interrupted only by legs 70 is defined between the bottom edge 72 of windscreen 68 and top 36.

Windscreen 68 also has a plurality of upstanding protrusions 74. These protrusions 74 provide an air gap between the windscreen 68 and the bottom surface of a chafing dish so that the flame is vented to the atmosphere.

In use, cover 24 of burner 10 is first separated from base 12 to permit an open can of Sterno jellied alcohol to be received into base 12, with the open end of the Sterno can extending upwardly. Cover 24 is thereafter replaced onto base 12 so that locking projections 54 engage locking channels 30. The assembled burner 10 can thereafter be carried about by means of handle 56. When it is desired to ignite the jellied alcohol, slide valve 40 is first slid open by pulling tab 66 of lever 60 outwardly with one's thumb, for instance, to expose the jellied alcohol. Suitable ignition means, such as a lighted match, is used to ignite the alcohol. Thereafter, regulation of the flame can be accomplished by varying the position of slide valve 40 to regulate the uncovered area of opening 38 and thus the flame size. The annular space between windscreen 68 and top 36 permits combustion air to approach the flame in a radially inward direction, while windscreen 68 alleviates the problem of occasional wind gusts extinguishing the flame.

What is claimed is:

1. A chafing dish burner comprising: an open-topped base; and a cover configured to close said open-topped base, said cover containing an opening therein, said cover further including a valve means including a sliding valve member for variably closing said opening, said sliding valve member being supported with respect to said cover so as to slide substantially linearly, said cover includes a top, an annular upstanding windscreen extending axially upwardly, said windscreen being axially spaced from said top by a plurality of downwardly extending legs such that an annular space interrupted by said legs is defined between said windscreen and said top.

2. The chafing dish burner of claim 1, in which said cover includes a handle extending substantially radially outwardly from said cover, with said valve means being supported so as to slide along a radius substantially parallel to said handle.

3. The chafing dish burner of claim 2, in which said opening is substantially rectangular.

4. The chafing dish burner of claim 2, in which said sliding valve member includes a lever extending along said handle parallel thereto and mounted to said handle to permit linear sliding movement between said lever and said handle in a longitudinal direction with respect to said handle.

5. The chafing dish burner of claim 2, in which said base includes a cylindrical lip portion at said open top, said cover includes a cylindrical sidewall configured to overlie said lip portion when said cover is attached to said base, and said cover lip portion and base sidewall include respective matingly engaging locking protrusions and locking channels.

6. The chafing dish burner of claim 5, in which said base includes a substantially cylindrical sidewall and an annular protrusion extending outwardly from said sidewall.

7. The chafing dish burner of claim 1, in which said cover includes L-brackets extending upwardly from said top and thence horizontally so as to overlie two opposite edges of said sliding valve member, with said sliding valve member overlying said top.

8. The chafing dish of claim 1 wherein said windscreen further includes a plurality of upwardly extending protrusions.

9. A chafing dish burner comprising:
an open-topped base;
a cover configured to close said open-topped base, said cover including an opening therethrough, said cover including a top and an annular upstanding windscreen extending axially upwardly, said windscreen being axially spaced from said top by a plurality of downwardly extending legs such that an annular space interrupted by said legs is defined between said windscreen and said top.

10. The chafing dish burner of claim 9, in which said cover includes valve means having a sliding valve member for variably closing said opening, said sliding valve member being supported with respect to said cover so as to slide substantially linearly.

11. The chafing dish burner of claim 10, in which said cover includes a handle extending substantially radially outwardly from said cover, with said valve means being supported so as to slide along a radius substantially parallel to said handle.

12. The chafing dish burner of claim 10, in which said opening is substantially rectangular.

13. The chafing dish burner of claim 11, in which said sliding valve member includes a lever extending along said handle parallel thereto and mounted to said handle to permit linear sliding movement between said lever and said handle in a longitudinal direction with respect to said handle.

14. The chafing dish burner of claim 13, in which said case includes a cylindrical lip portion at said open top, said cover includes a cylindrical sidewall configured to overlie said lip portion when said base is attached to said base, and said cover lip portion and sidewall include respective matingly engaging locking protrusions and locking channels.

15. The chafing dish burner of claim 14, in which said base includes a substantially cylindrical sidewall and an annular protrusion extending outwardly from said sidewall.

16. The chafing dish burner of claim 10, in which said cover includes a top and L-brackets extending upwardly from said top and thence horizontally so as to overlie two opposite edges of said sliding valve member, with said sliding valve member overlying said top.

17. The chafing dish of claim 9 wherein said windscreen further includes a plurality of upwardly extending protrusions.

* * * * *